United States Patent [19]

Ishikawa et al.

[11] Patent Number: 4,625,329
[45] Date of Patent: Nov. 25, 1986

[54] POSITION ANALYZER FOR VEHICLE DRIVERS

[75] Inventors: Hiroshi Ishikawa, Nagoya; Kazuma Matsui, Toyohashi; Takashi Kurahashi, Aichi; Hidehiko Akatsuka; Motokazu Yamada, both of Nagoya, all of Japan

[73] Assignee: Nippondenso Co., Ltd., Kariya, Japan

[21] Appl. No.: 692,545

[22] Filed: Jan. 18, 1985

[30] Foreign Application Priority Data

Jan. 20, 1984 [JP] Japan .................................... 59-9344

[51] Int. Cl.$^4$ ............................................. G06K 9/00
[52] U.S. Cl. ....................................... 382/1; 180/271; 350/637
[58] Field of Search ................. 356/152; 180/271, 272; 340/52 E, 52 F, 52 R; 382/1; 350/281, 637

[56] References Cited

U.S. PATENT DOCUMENTS 4,111,555  9/1978  Ellis ...................................... 356/152
4,475,814  10/1984  Marche .............................. 356/152

Primary Examiner—David K. Moore
Assistant Examiner—Jacqueline Todd
Attorney, Agent, or Firm—Cushman, Darby & Cushman

[57] ABSTRACT

An image analyzer for analyzing the position of a vehicle driver in a three-dimensional coordinate system. The analyzer comprises a light emitting element for emitting an infrared light the driver's face portion and an image detector arranged to receive reflected infrared light to generate an optical image of the driver's face portion. A microcomputer includes a memory for storing an electronic image corresponding to the optical image and processes the stored image to determine the position of a facial feature, such as an eye, in a three-dimensional coordinate system. Position indicating data is utilized in a driver assistance system.

14 Claims, 18 Drawing Figures

| | | | | | | |
|---|---|---|---|---|---|---|
| | | | | | | |
| | | | $a_1$ | $a_2$ | $a_3$ | |
| | | | $a_4$ | $a_0$ | $a_5$ | |
| | | | $a_6$ | $a_7$ | $a_8$ | |
| | | | | | | |

POSITION ANALYZER FOR VEHICLE DRIVERS

BACKGROUND OF THE INVENTION

The present invention relates to position analyzers for vehicle drivers for analyzing the position of a vehicle driver, and in particular to such a position analyzer which determines the position of a vehicle driver in a three-dimensional coordinate system by processing signals supplied from a pair of two-dimensional image sensors.

Recent demands for improvements on automobiles have been directed to manually operated vehicle accessory devices which involve human-factor engineering, such as angle adjustment for rearview mirrors and air-conditioner exhaust duct and height adjustment for a tiltable steering wheel and headrest. It has been desired to allow these manual operations to be automatically performed according to the particulars of a vehicle driver. To achieve automatic operation it is necessary to obtain information on the position of the vehicle driver. A current practice involves detecting the fore-and-aft and height positions of a driver or his reclined posture to derive his personal position data. However, no personal data such as height and seated posture have been taken into account, thus precise information for individual drivers is lacking.

Automatic adjustment is thus desired to adapt the positions of driver assistance systems to individual driver's changing position. However, it requires precise determination of individual driver's positions in a three-dimensional coordinate system.

SUMMARY OF THE INVENTION

The present invention has for its object the provision of a position analyzer for vehicle drivers to derive accurate positional information on a three-dimensional coordinate system in order to constantly adapt vehicle accesories to the varying position of the driver.

As shown in FIG. 1, the position analyzer of the invention generally comprises a light emitting means M2 for illuminating a vehicle driver M1, light detecting means M4 comprising a pair of two-dimensional image detectors M3 for detecting light reflected from the driver M1 as a result of the illumination, and recognition means M5 for determining the position of the driver in a three-dimensional coordinate system from the images detected by the detecting means M4.

The position analyzer of the invention comprises a light emitting means for illuminating a vehicle driver, light detecting means comprising a pair of two-dimensional image detectors for detecting light reflected from the driver as a result of the illumination, and means for determining the position of the driver in a three-dimensional coordinate system from the images detected by the detecting means.

Therefore, the driver's position in a three-dimensional coordinate system can be determined using a pattern recognition technique so that the determination is independent of driver's height and posture. The three-dimensional position information allows automatic adjustment of the tilt angle of rearview mirror, the orientation of air directed from air conditioner, and the angular position of tiltable steering wheel or head rest.

The invention also makes possible the development of a safety assurance system which provides an early warning when the driver is incapacitated as a result of over drinking or when the driver's attention is distracted by constantly monitoring the movement of the driver's head.

BRIEF DESCRIPTION OF THE DRAWINGS

The present invention will be described in further detail with reference to the accompanying drawings, in which:

FIG. 10A is an illustration of a binary quantized image;

FIG. 10B is an illustration of a method for detecting a maximum white area within the binary quantized image;

DETAILED DESCRIPTION

Figure 2:
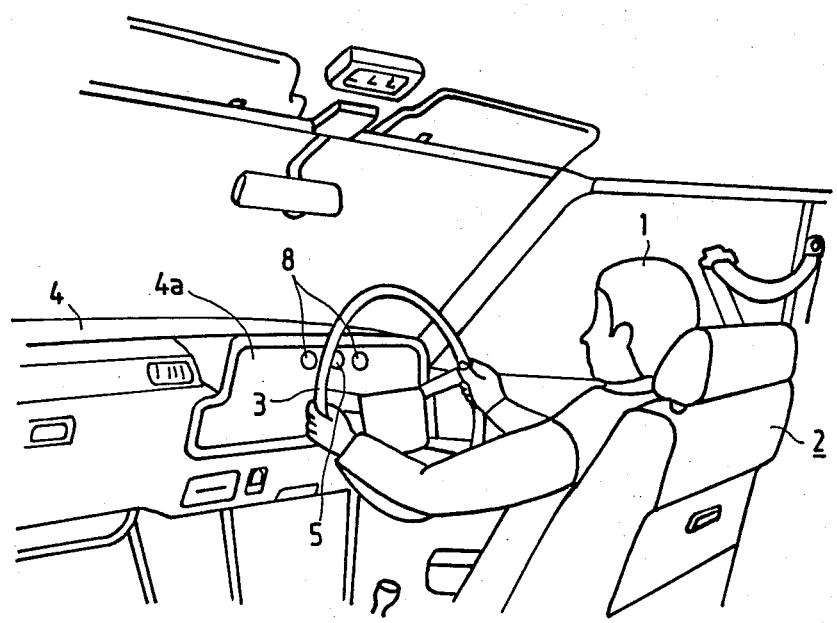
FIG. 2 is an illustration of a layout of essential parts of the position analyzer mounted in a vehicle.

In FIG. 2, numeral 1 indicates a vehicle driver, 2 indicating a driver's seat, 3 indicating a steering wheel, 4a indicating an instrument panel of a dashboard 4, 5 indicating an infrared strobe located on the instrument panel 4a. This infrared strobe will be used as a flashing light source. Numeral 8 indicates an image sensor which essentially comprises infrared detectors 9a, 9b, liquid-crystal light regulating elements 12a, 12b and charge-coupled devices 9a, 9b and image signal controllers 14a and 14b. A microcomputer 20 performs the recognition and analysis of image data. Numeral 22 indicates a central processing unit and 24 indicates a read only memory which stores control and arithmetic operation programs. Numeral 26 represents a random access memory for writing and reading image data. A timer 27 issues a timer interrupt commands to the CPU 24 at periodic intervals determined in accordance with stored data. Analog image signal from image sensor 8 is received at analog input port 28. Control signals from the microcomputer 20 to an infrared flash lamp 5 and image sensor 8 are provided from output port 30. The CPU 22, ROM 24, RAM 26, timer 27, input port 28 and output port 30 are interconnected by a common bus 31. A power supply circuit 32 receives voltage from a battery 34 through an ignition key-operated switch 36 and supplies a constant DC voltage to all parts of the control circuit 20.

Figure 3:
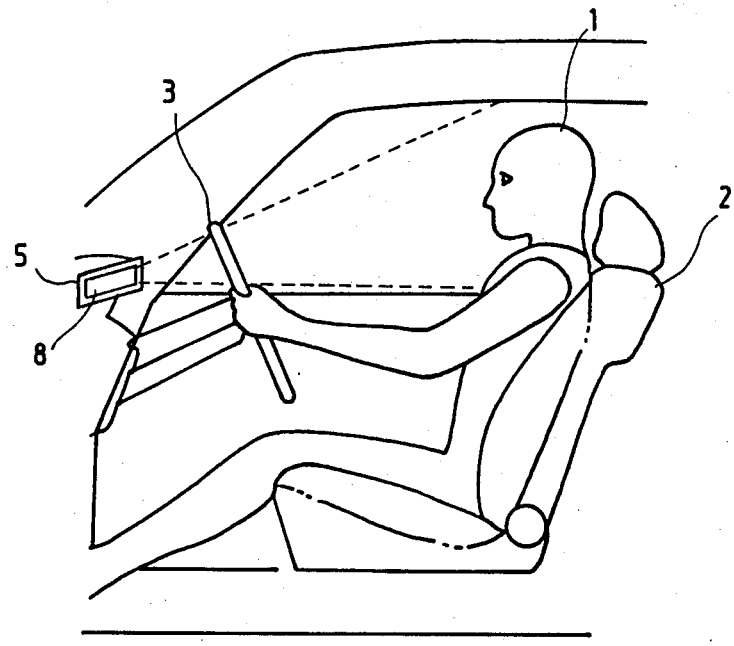
FIG. 3 is an illustration of a side view of the vehicle.
Figure 4:
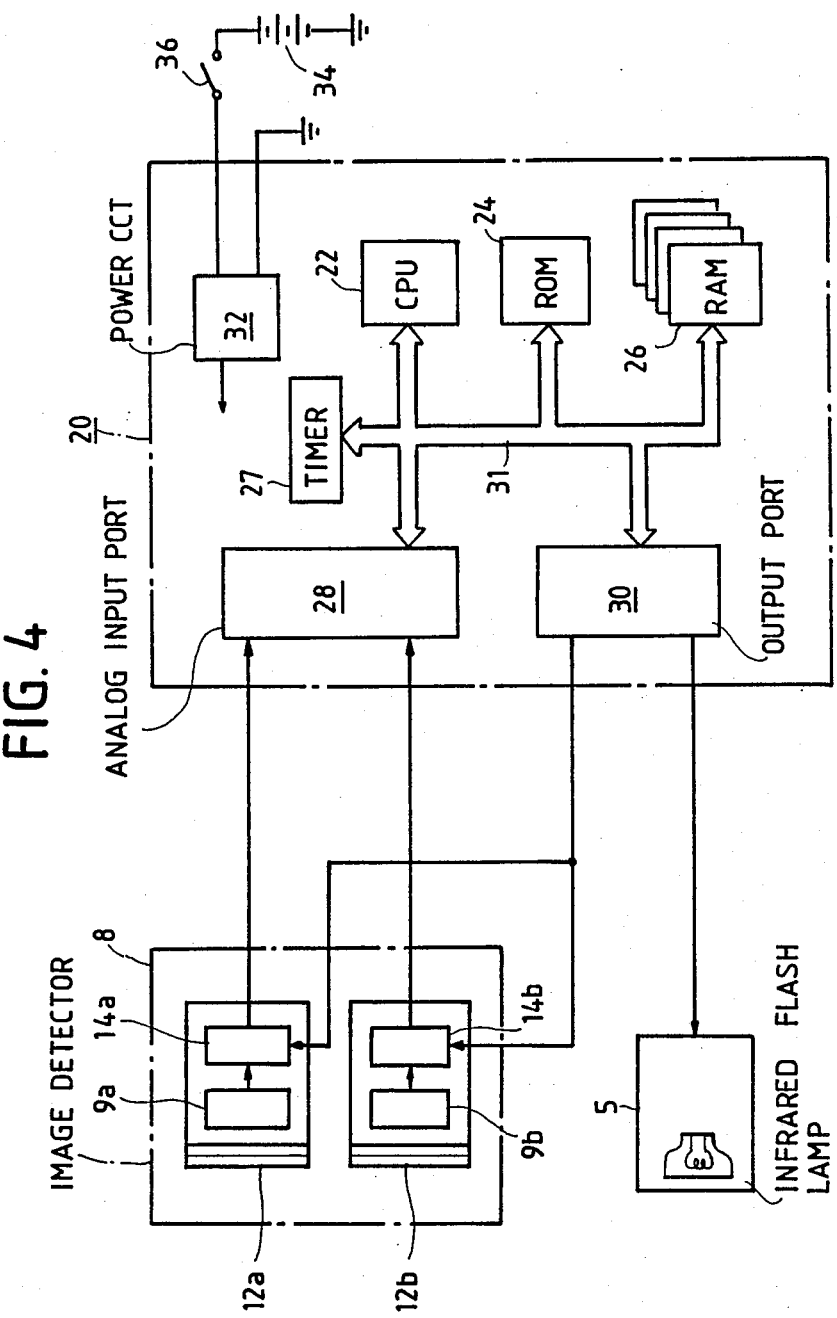
FIG. 4 is an illustration of a block diagram of an embodiment of the present invention.

As illustrated in FIGS. 2 and 3, the infrared flash lamp 5 is located in front of the a driver's seat 2 in a position lower than the driver's head so that light from the flash lamp passes through the steering wheel 3 and illuminates an area in which the head portion 1 of a driver may move under all conceivable driving conditions. The charge-coupled devices 9a and 9b of the image sensor 8 are located on opposite sides of, and symmetrically with respect to, the optical axis of the infrared flash lamp 5. Reflecting light is focused on the charge-coupled devices 9a and 9b by means of an optical system to be described later.

Reference will now be made to FIGS. 5, 6, 7A and 7B in which the details of the infrared flash lamp 5, the image sensor 8 and the liquid-crystal light regulating element are respectively shown.

Figure 5A:
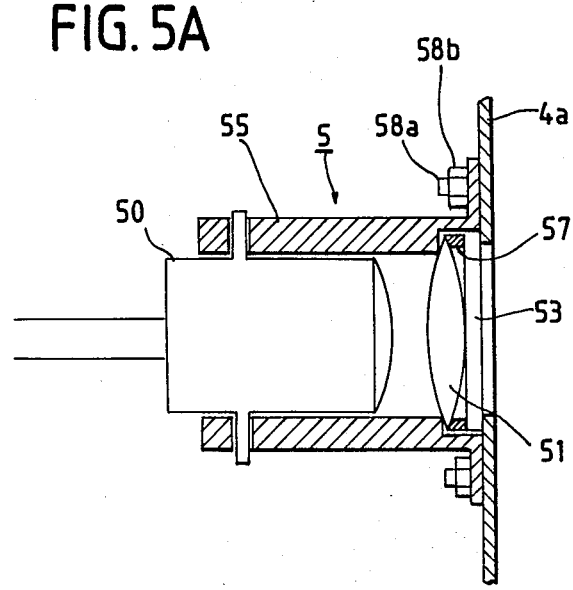
FIG. 5A is an illustration of an infrared flash lamp.
Figure 5B:
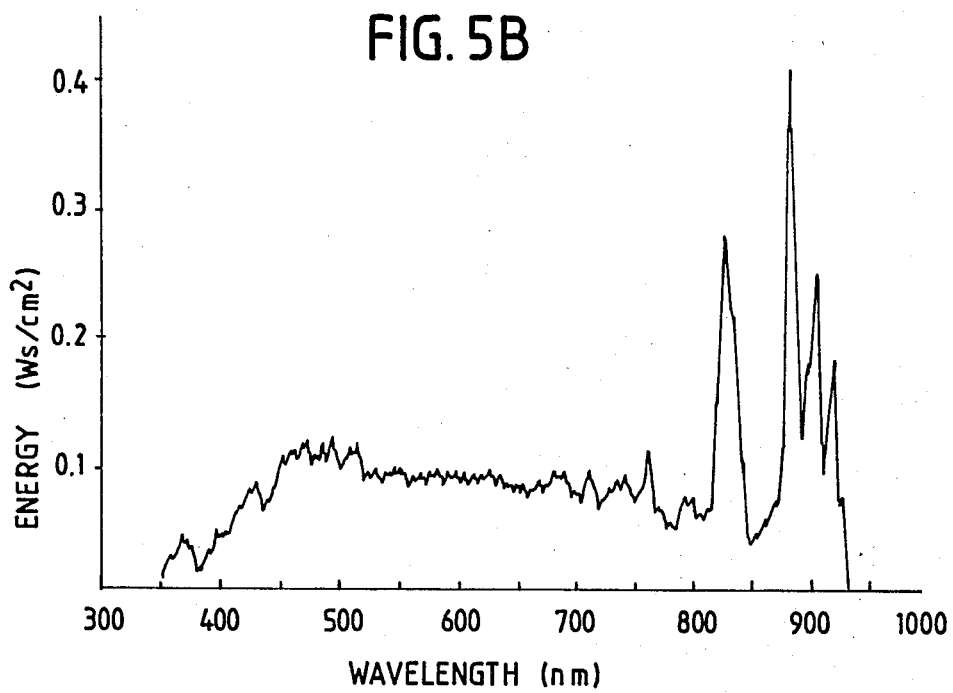
FIG. 5B is a graphic illustration of the spectrum of light emitted by the flash lamp.

FIG. 5A illustrates a side view of the infrared flash lamp 5. Illustrated at 50 in this figure is an infrared light source. The infrared light from the light source 50 is spread by a diverging lens 51 toward the driver 1 through an infrared-light filter 53. The lens 51 and filter 53 are secured in an inner cylindrical casing 57 which is mounted in an outer casing 55. The flash lamp 5 is fixedly secured to the center of the instrument panel 4a by bolts 58a and nuts 58b. Light emitted from source 50 contains a substantial amount of visible light spectrum as shown at FIG. 5B. The filter 53 is to cut off light spectrum having a wavelength of 800 nanometers or less. The driver's upper half is illuminated with radiation which is insensitive to the driver's eyes.

Figure 6:
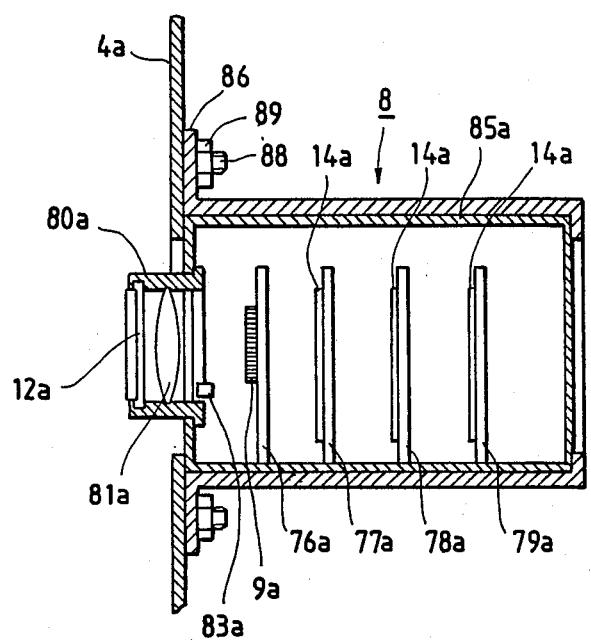
FIG. 6 is an illustration of an image detector.

Since the image sensor 8, shown at FIG. 6, comprises a pair of identical parts, description will only concern the charge-coupled device 9a, liquid-crystal light regulating element 12a and image signal controller 14a which constitute one of the identical parts.

The charge-coupled device 9a is mounted on a print board 76a and the controller 14a is separated into sections which are mounted respectively on print boards 77a, 78a and 79a. In a lens mount 80a, a focusing lens 81a having a focal distance f is located to focus light passing through the light-regulating element 12a on the charge-coupled device 9a. A phototransistor 83a is also incorporated in the lens mount to detect the amount of light rays incident on the charge-coupled device 9a. The print boards 76a, 77a, 78a and 79a are mounted in a casing 85a having a flange 86 which is fixed to the instrument panel 4a by bolts 88 and nuts 89. Two of such identical parts are located in symmetrical relationship to the center of the flash lamp 5 to form the image sensor 8.

Figure 7A:
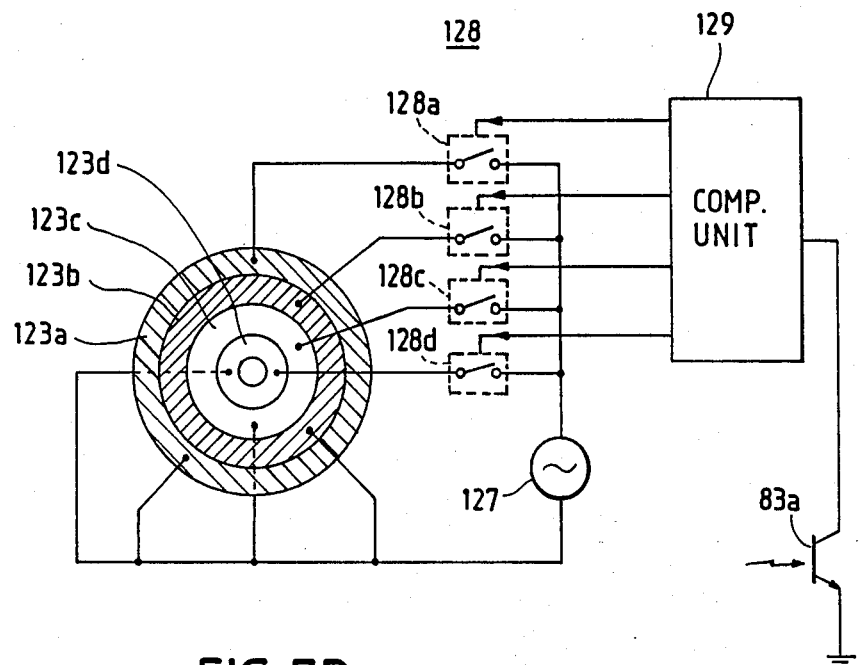
FIG. 7A is an illustration of a liquid crystal light regulating device.
Figure 7B:
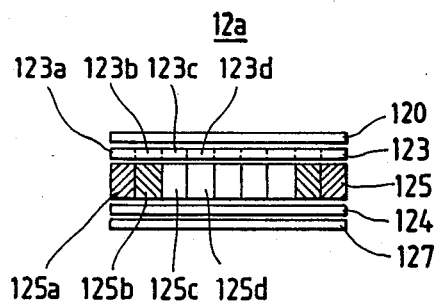
FIG. 7B is a cross-sectional view of the light regulating device.
Figure 8:
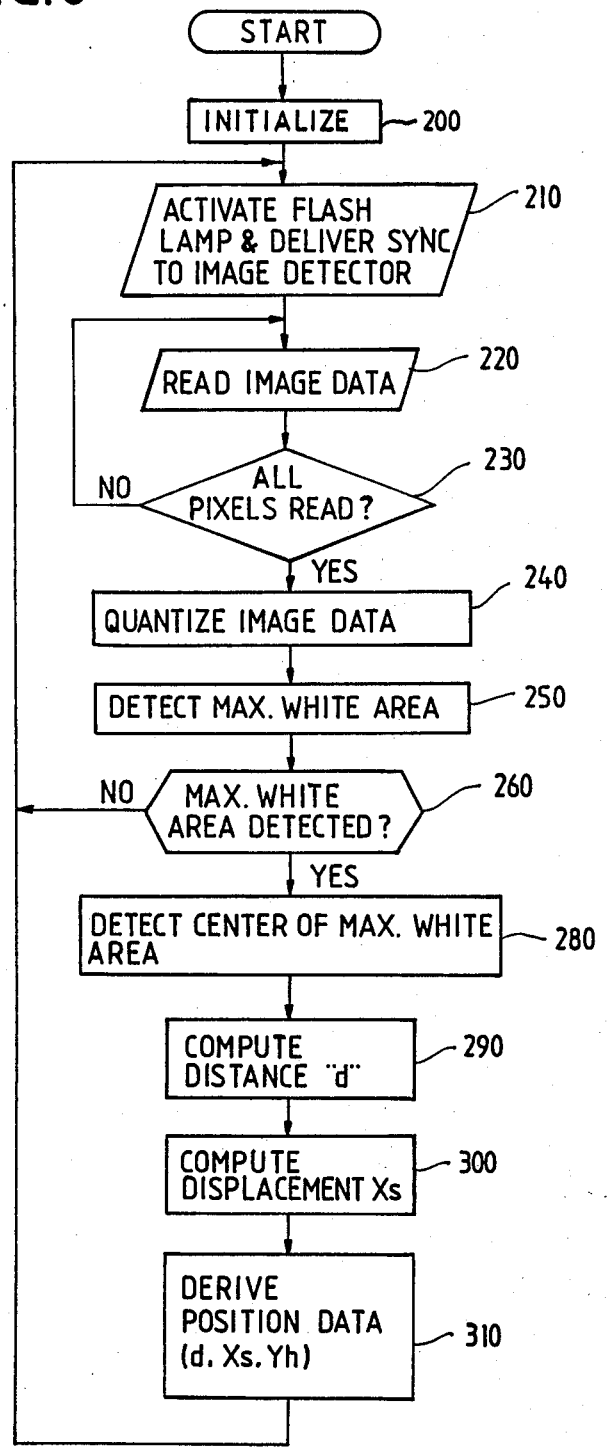
FIG. 8 is an illustration of a flowchart describing the steps for determination of the driver's position in a three-dimensional coordinate system.

The light-regulating elements 12a, 12b, shown in FIGS. 7A and 7B, comprise two polarizers 120 and 121 each having a polarization plane the direction of which is orthogonal to the polarization plane of the other. A liquid crystal 125 is located between transparent electrodes 123 and 124. In the illustrated embodiment, liquid crystal 125 and transparent electrodes 123 and 124 are each divided into four concentric segments indicated by characters a, b, c and d to control the intensity of light at five incremental steps. Opposed pairs of the segmented electrodes are connected by lead wires through an analog switching circuit 128 to a voltage source 127. Switches 128a, 128b, 128c and 128d of the switching circuit 128 are controlled by signals derived from a comparator unit 129 which compares the intensity of a current detected by the phototransistor 83a with different values of threshold. As a function of the intensity of current supplied from phototransistor 83a the switches 128a to 128d are operated in successively increasing number so that when light intensity is at minimum a voltage is supplied from source 127 only to the electrodes 123a, 124a and when that intensity is at maximum the voltage is supplied to all the electrodes. In the absence of a voltage, liquid crystal 125 imparts a 90° turn to the polarization plane of the light incident thereon. Light leaving the polarizer 120 as a parallelly-polarized light undergoes a 90° shift as it passes through the liquid crystal 125 when the voltage is not impressed and passes through the second polarizer 121 and is focused by lens 81a onto the charge-coupled device 9a. When voltages are impressed on the electrodes, the corresponding portions of the liquid crystal 125 are made to change crystalline orientations and the light passing through the voltage-impressed portions of liquid crystal 125 is blocked by the polarizer 121. As the switches are operated beginning with switch 128a followed successively by switches 128b, 128c and 128d in the order named, the light regulating device 12a decreases the quantity of light passing therethrough beginning with the outer circumferential portion until the light is completely shut off in a manner identical to conventional iris mechanisms. The function of the light regulating device is to maintain the quantity of light incident on the charge-coupled device 9a at a constant value.

The regulated light is focused on the charge-coupled device 9a by lens 81a. The sharpness of the focused image increases with the iris action of the light regulating device 12a. The charge-coupled device 9a has a matrix array of 512×512 pixels. The incident light is thus resolved into optical elements and the incident intensity of each element is converted to corresponding electrical energy and stored in each pixel. The controller 14a successively scans the pixels to read the stored charges from one pixel to another. Since the charge stored in a pixel is proportional to the interval between successive read operations, the pixels are scanned at a uniform rate throughout the matrix array. The stored charges are sequentially read out of the charge-coupled device 9a into the analog input port 28 of the microcomputer 20.

Reference will now be made to FIGS. 8, 9, 10A and 10B in which the flowchart of the micrcomputer 20, the detail of the optical system and an example of image analysis, are respectively illustrated.

Figure 9:
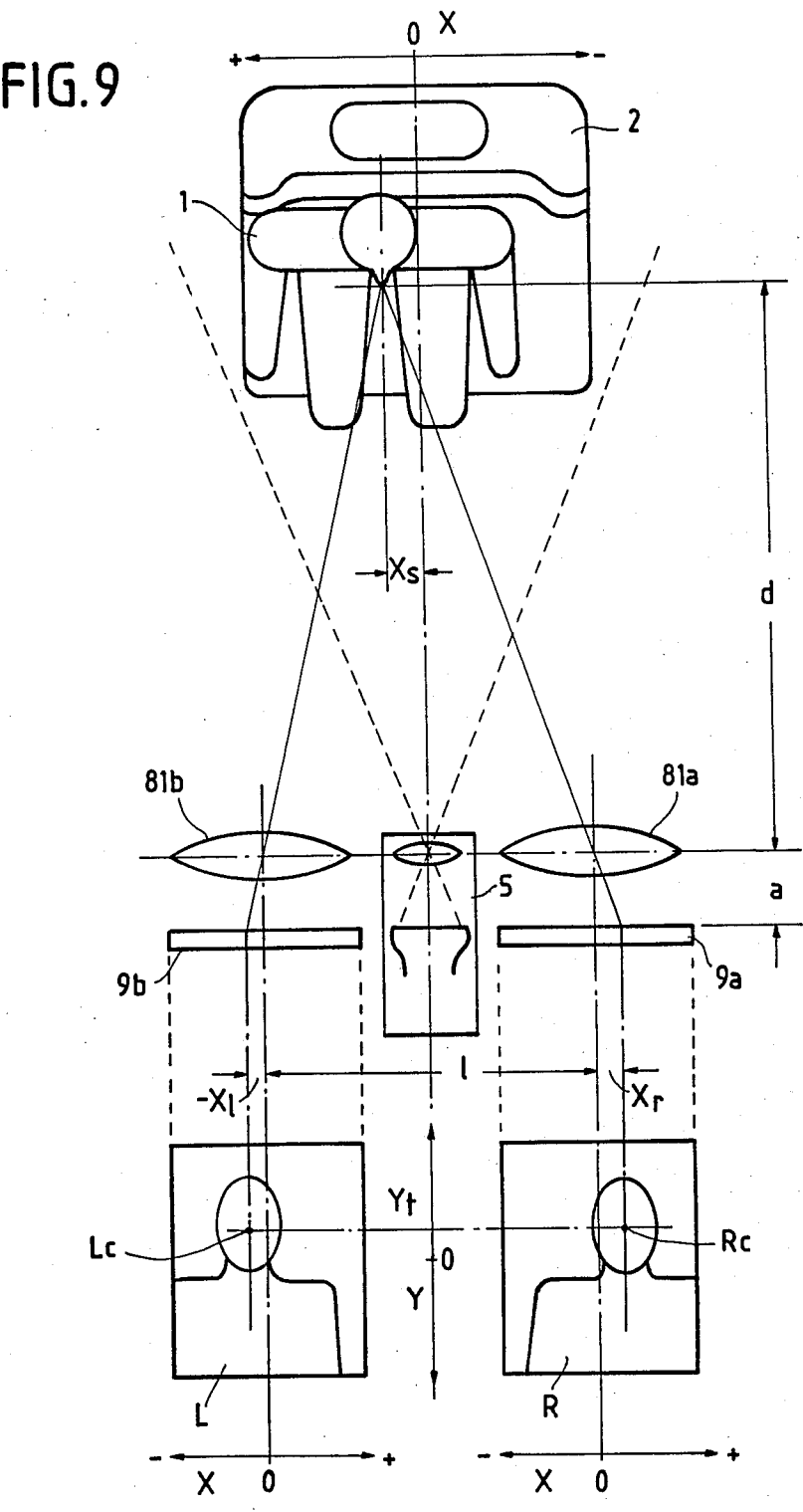
FIG. 9 is a plan view of an optical system.

When the key switch 36 is turned on, an image recognition and analysis program starts with initialization step at block 200 by which the internal registers of CPU 22 are cleared and various parameters are set in associated storage areas. In block 210 the CPU provides causes the output port 30 to issue an activating signal to the infrared flash lamp 5 and a sync signal to the image controllers 4a and 14b for read operation. Infrared light is emitted to the driver 1. Light reflected off the driver and surrounding objects is focused on the charge-coupled devices 12a and 12b of the image sensor 8. The amount of light incident on the charge-coupled devices is controlled by the light regulating devices 12a and 12b, respectively, in accordance with the sensitivities of these charge-coupled devices. Optical images of the driver's bust, as shown at R and L in FIG. 9, are therefore focused respectively on the charge-coupled devices. Charges stored in these charge-coupled devices 9a, 9b are scanned from one pixel to another beginning with the upper left corner of the image down to the bottom right at intervals of the sync supplied from the microcomputer and transmitted to the analog input port 28. In block 220, the image signals from controllers 14a and 14b converted at high speed to digital signals and stored into respective image storage areas of RAM 26. A decision step in block 230 checks to see if the charges stored in all the pixels have been loaded into the microcomputer and, if not, control returns to block 221 to repeat the steps at blocks 220 and 230 until all the elemental image data are stored into the respective storage areas of RAM 26. With the image taking process just mentioned, the driver's bust images are respectively stored as "frozen" images upon which the following pattern recognition proceses will be performed.

Figures 10A, 10B:
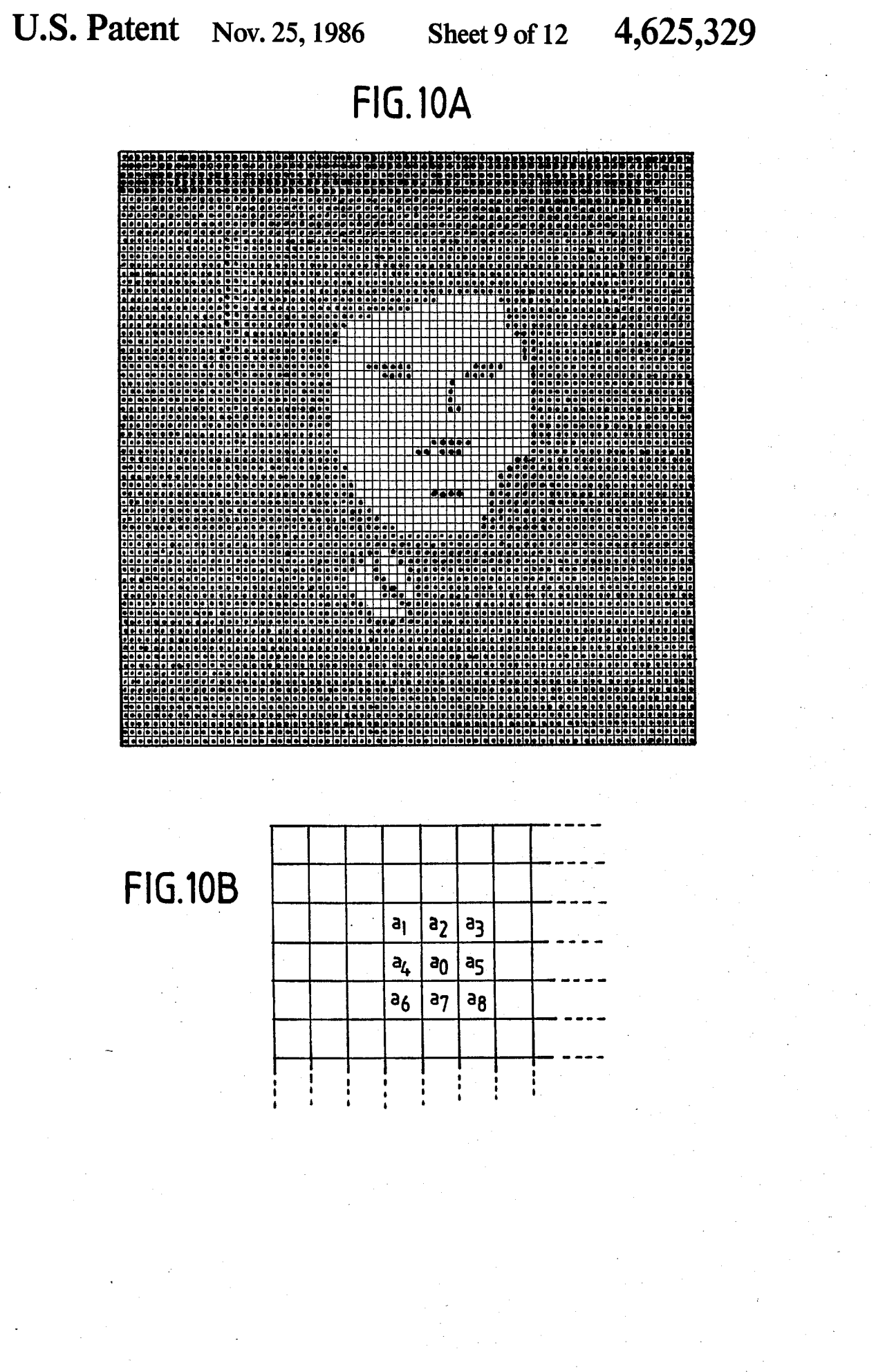

The pattern recognition process starts with a binary quantization step in block 240 by which the image data stored on respetive storage areas of RAM 26 are converted to a signal having one of two discrete values depending on whether the pixel image has an intensity greater than a predetermined value or not. The charge stored on a pixel having a lower intensity corresponds to a darker area of the image area and produces a signal indicating a black level and the charge having a higher intensity corresponds to a brighter area and produces a signal indicating a white level. FIG. 10A represents a binary quantized image stored cell locations of in RAM 26.

An execution step in block 250 is to detect a white area which contains a maximum number of white cells enclosed by black cells. This is accomplished by scanning the binary quantized image to detect a white cell and assigning a particular number to the detected white cell. For example, if a cell $a_0$ is surrounded by eight cells $a_1$ through $a_8$ as shown in FIG. 10B, cells $a_1$ through $a_4$ are checked to see if they contain a white cell to which a particular label number is assigned, and if so, the cell $a_0$ will be assigned the same label number as assigned to that while cell, and if not, the cell $a_0$ will be given a new label number. This process is repeated until all white cells are assigned label numbers. In this way, white cells surrounded by black cells are labeled with like numbers. The number of such cells is counted for each closed white area and compared with counts derived from other closed white areas to detect one having a greatest count. Therefore, white cells having like label numbers are counted for each of the three closed white areas as indicated in FIG. 10A and the face area is detected as having the greatest count.

Block 260 now follows to test whether a maximum white area is detected. In the event that the illuminated area is traversed by the spokes of a spinning steering wheel or that the driver turns his head round at the instant of illumination, the driver's face is not properly recorded. In such events, decision in block 260 will cause control to return to block 210 to repeat the above steps. Otherwise, control exits to an execution step in block 280.

In block 280, the CPU seeks the center point of the maximum white area by first detecting the peripheral cells located along the contour of the maximum area and measuring the distances of a given white cell within that area to the peripheral cells and summing the measured distances. This process is repeatedly performed on different white cells to derive distance sums. The distance sums are compared against each other to detect one having a minimum value which is interpreted as corresponding to the center point of the face. Alternatively, the vertical and horizontal dimensions of the white area are measured and the cross point of lines bisecting the vertical and horizontal dimensions is detected as corresponding to the center point.

In this way, center points Rc and Lc are detected on the X-Y coordinate systems of the charge-coupled devices 9a and 9b as intersections at $+Xr, Yt$ and $-Xl, Yt$, respectively, as shown in FIG. 9, which are respectively indicative of displacements from the respective centers of the charge-coupled devices which are respectively aligned with the optical axes of lenses 81a and 81b.

A measurement step is then executed in block 290 to detect the distance from the image sensor 8 to the driver 1 on the basis of the X-axis displacements Xr and Xl. As shown in FIG. 9, distance d from driver 1 to the lenses 81a and 81b is given by:

$$d = a \times l/(Xr - Xl) \tag{1}$$

where, a is the distance between the lenses and associated charge-coupled devices 9a, 9b and l is the distance between the optical axes of lenses 81a and 81b.

Since $1/f = 1/a + 1/d$ and a is much smaller than d, the distance d is alternatively given by:

$$d = f \times l/(Xr - Xl) \tag{2}$$

The CPU computes the distance d according to Equation 2 and stores it into a specified address location of RAM 26. Control proceeds to an execution step in block 300 to determine the lateral displacement of the driver's position on the X axis.

If the driver is seated in a position displaced a distance Xs from the center axis of the seat 2 with respect to which the charge-coupled devices 9a and 9a are symmetrical to each other, the distance Xs is given by:

$$Xs = Xr \times d/a - l/2 \tag{3}$$

Since a is much smaller than d, Equation 3 is rewritten as:

$$Xs = Xr \times d/f - l/2 \tag{4}$$

Data derived from Equation 3 or 4 is stored in a specified location of RAM 26. Control then advances to block 310 to determine the driver's position in a three-dimensional coordinate system.

Since the driver's height Yh can be readily derived from the coordinate Yt which is used in block 280, the driver's position in the three-dimensional coordinate system is represented by a set of three coordinates d, Xs and Yh. Therefore, in block 310 the CPU addresses the specified location of RAM 26 to read data Yt to derive Yh and further addresses the locations in which the coordinate data d and Xs are stored and store this set of data into a specified location of RAM 26 to be used in a manner as will be described later. Control now returns to block 210 to repeat the above-described steps.

The position analyzer of the present invention provides an accurate representation of the driver's position. The use of infrared light immunizes the system from ambient light and allows accurate measurement without causing disturbance to the driver and the use of solid state image sensors allows compact design. Since there is no moving parts, the analyzer is immune to vibrations and ensures high reliability. Since the intensity of light incident on the charge-coupled devices is controlled at a constant level, the so-called "blooming" effect is prevented.

The position analyzer of the invention can be used in the following accessory systems.

Figure 1:
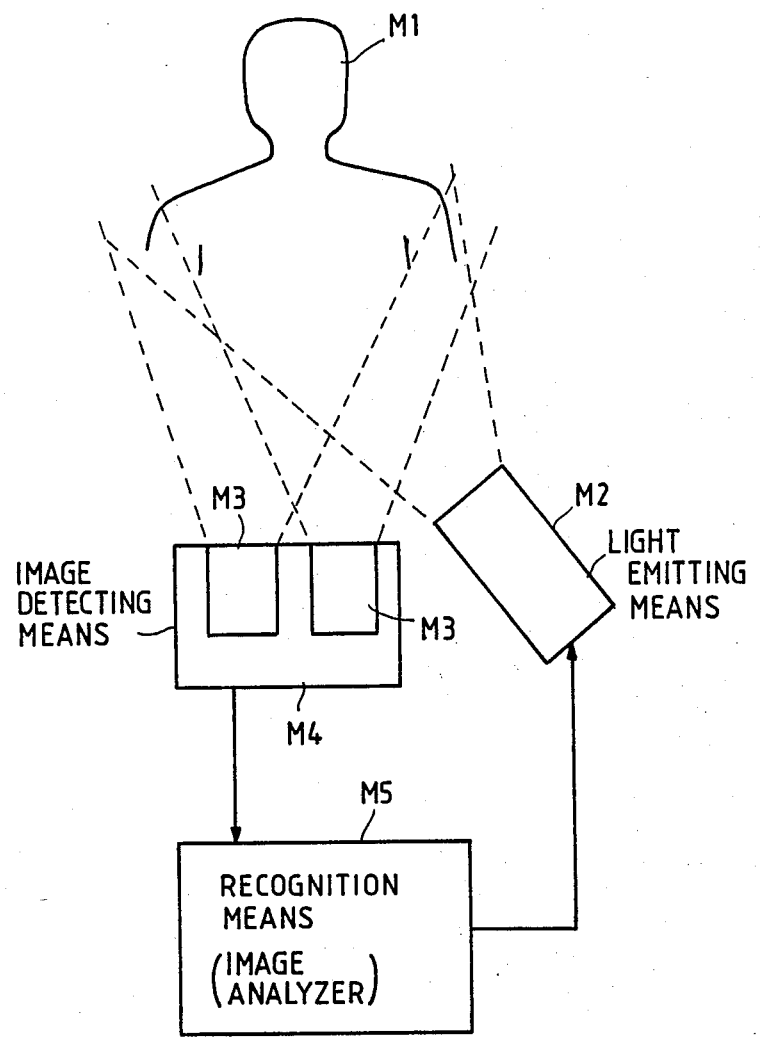
FIG. 1 is an illustration of the basic structure of the position analyzer of the present invention.
Figure 11:
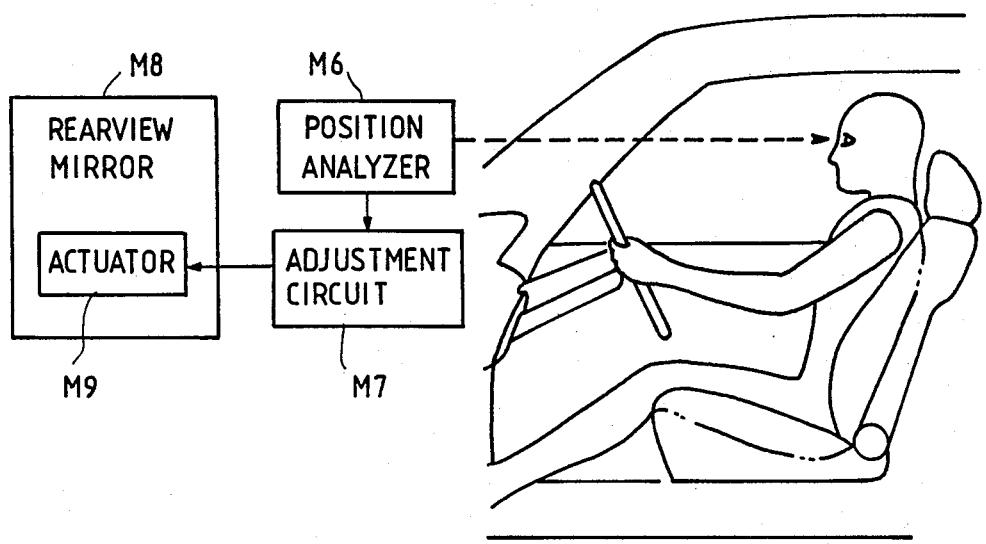
FIG. 11 is an illustration of a second embodiment of the present invention.

In FIG. 11, the position analyzer M6 comprises the light emitting member M4 and the recognition means, or an image analyzing circuit M5 of FIG. 1 and the drawings that follow. The accessory system comprises a rearview mirror M8, a mirror actuator M9 which controls the reflection angle of the mirror M8 and an adjustment circuit M7 which drives the actuator M9 in response to the three-dimensional position information.

Figure 12:
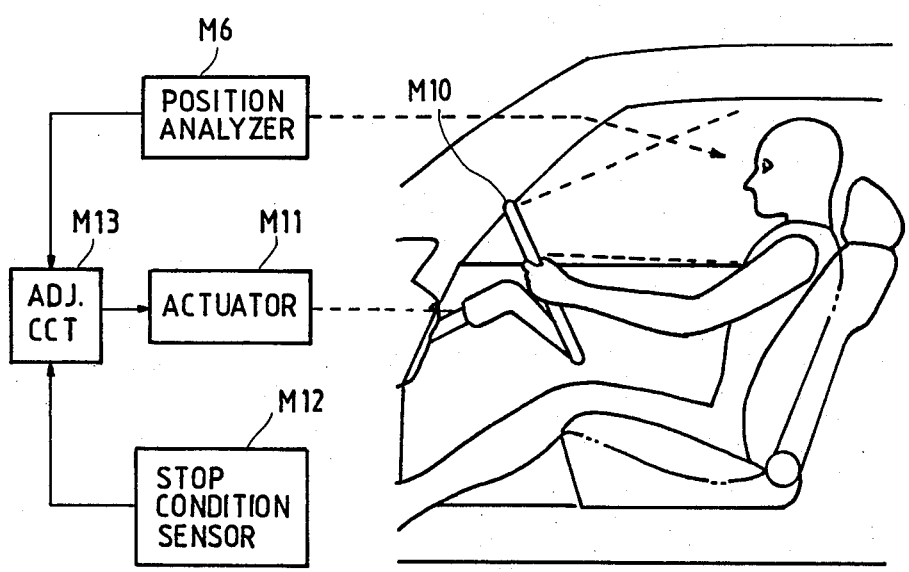
FIG. 12 is an illustration of a third embodiment of the present invention.

In FIG. 12, the accessory system comprises an actuator M11 that controls the tilt angle of steering wheel M10, a stop condition sensor M12 for detecting when the vehicle is at standstill, and an adjustment circuit M13 which drives the actuator M11 in response to signals from the position analyzer M6 and stop condition sensor M12. The adjustment circuit M13 drives the actuator M11 such that the steering wheel M10 is at proper tilt angle when the vehicle is at standstill in accordance with the three-dimensional position information from the position analyzer M6.

Figure 13:
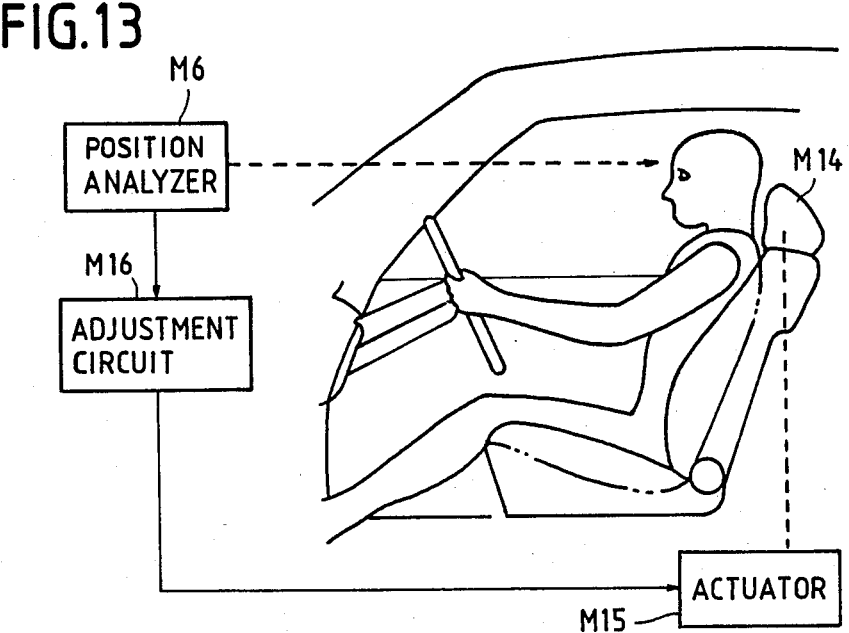
FIG. 13 is an illustration of a fourth embodiment of the present invention.

In FIG. 13, the accessory system comprises an actuator M15 which controls the height and/or tilt angle of head rest M14 and an adjustment circuit M16 that drives the actuator M15 in response to the output of position analyzer M6 so that the position and/or tilt angle of the head rest is constantly adjusted to fit to the driver's head.

Figure 14:
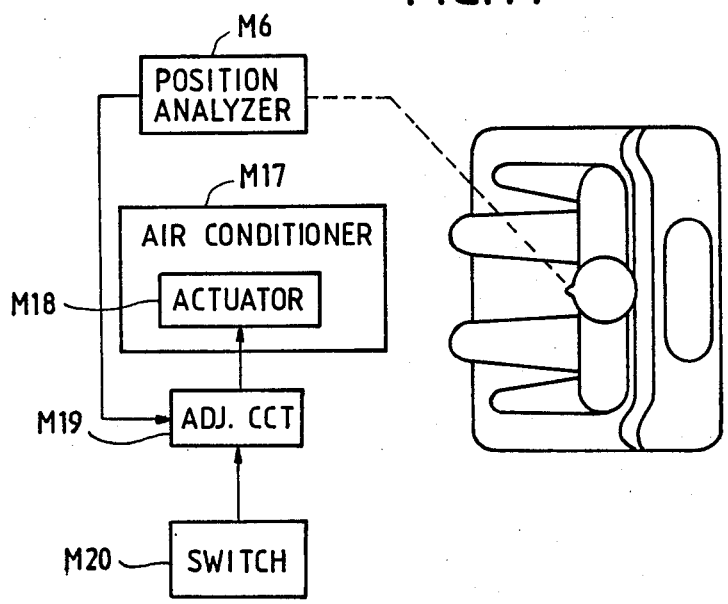
FIG. 14 is an illustration of a fifth embodiment of the present invention.

In FIG. 14, the accessory system comprises an actuator M18 that controls the direction of air from a vehicle air conditioner M17 and an adjustment circuit M19 that drives the actuator M18 in response to the output of position analyzer M6. When a signal is received from a cool-mode switch M20, the adjustment circuit M19 drives the actuator M18 so that the air from the air conditioner M17 is directed toward the face of the driver for a preselected period of time.

Figure 15:
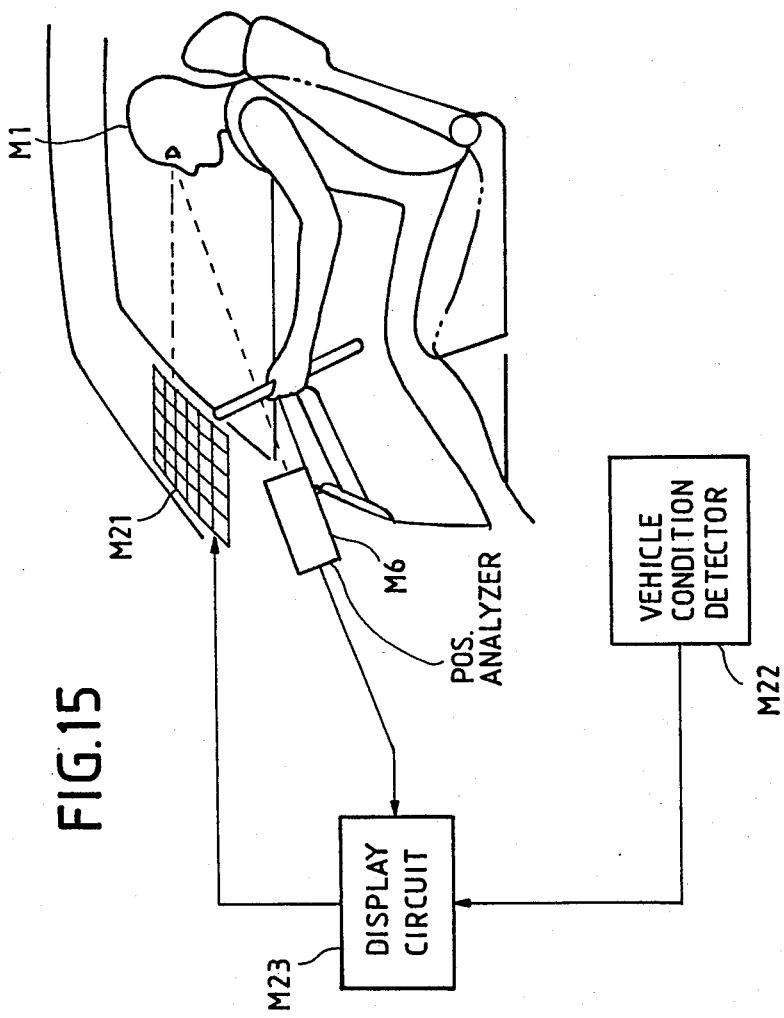
FIG. 15 is an illustration of a sixth embodiment of the present invention.

The accessory system of FIG. 15 comprises a vehicle condition sensor, or vehicle speed sensor M22, a transparent display panel M21 on the windshield of the vehicle and a display control circuit M23 which provides signals to the display M21 to indicate information on the optimum distance to a preceding car or like information. The display control circuit M23 responds to the output of position analyzer M6 to constantly adjust the position of information on display panel M21 so that it is always inside of the driver's view but outside of the area in which the driver's attention is concentrated.

The foregoing description shows only preferred embodiments of the present invention. Various modifications are apparent to those skilled in the art without departing from the scope of the present invention.

For example, an infrared light-emitting diode may be used instead of the flash lamp 5 and the diode is operated on a continuous mode instead of the pulse mode operation. In that instance, the imager controllers can be simplified by eliminating the timing circuit that is required to establish proper timing for emission of light and detection of reflected light.

The liquid-crystal light regulating devices 12a and 12 could be replaced with conventional iris mechanisms or transparent birefringence ceramic devices. The birefringence ceramic devices are advantageouss on account of their reliability.

The light emission and detection means may be mounted on the column of the steering wheel, for example, instead of the instrument panel.

In the pattern recognition process, differentiation technique may be employed to detect the contours of white areas instead of binary quantization technique.

It is also possible to determine the driver's position by detecting the location of the driver's eyes, mouth or nose on a coordinate system, rather than detecting the center of the driver's face. Furthermore, the position of the rearview mirror may be taken to correspond to the reference of polar coordinates instead of the position of the image sensor. Such polar coordinate system is particularly advantageous for accessory systems in which the rearview mirror is adjusted.

What is claimed is:

1. A position analyzer for a vehicle driver, comprising:
   light emitting means for directing light to said driver's face;
   light detecting means comprising a pair of two-dimensional image sensors for detecting light reflected from said driver's face; and
   recognition means for determining the position of said driver in a three-dimensional coordinate system in response to optical images detected by said image sensors.

2. A position analyzer as claimed in claim 1, wherein said light emitting means is arranged to emit light at periodic intervals and said recognition means is synchronized with said light emitting means to respond to said periodically emitted light.

3. A position analyzer as claimed in claim 2, wherein said image sensors are solid-state image sensors.

4. A position analyzer as claimed in claim 3, wherein said light emitting means comprises an infrared light emitting means and wherein said light detecting means comprises an infrared light detecting means.

5. A position analyzer as claimed in claim 4, wherein said infrared light emitting means comprises an infrared light flash lamp.

6. A position analyzer as claimed in claim 1, wherein said light emitting means is located in such a position that the emitted light is directed at an angle of elevation to said driver's face from in front of the driver and wherein said image sensors are located in front of said driver to receive light reflected from said driver's face.

7. A position analyzer as claimed in claim 6, wherein said image sensors are located on the instrument panel of a vehicle in a symmetrical relationship to each other with respect to a line bisecting a driver's seat.

8. A position analyzer as claimed in claim 1, further comprising utilization means having a physical position therein, said utilization means being responsive to said recognition means to control said physical position.

9. An image analyzer as claimed in claim 8, wherein said utilization means comprises an adjusting means for controlling the angular position of a rearview mirror.

10. An image analyzer as claimed in claim 8, wherein said utilization means comprises an adjusting means for controlling the angular position of a steering wheel.

11. An image analyzer as claimed in claim 8, wherein said utilization means comprises an adjusting means for controlling one of the angular and height positions of a head rest.

12. An image analyzer as claimed in claim 8, wherein said utilization means comprises an adjusting means for controlling the direction of air directed from an air conditioner.

13. An image analyzer as claimed in claim 8, wherein a display means and an adjusting means for controlling the position of data to be displayed on said display means.

14. An image analyzer as claimed in claim 13, wherein said display means is arranged to respond to vehicle operating conditions.

* * * * *